United States Patent [19]

Ferdinand et al.

[11] 4,381,103
[45] Apr. 26, 1983

[54] STRAIGHT EDGE GUIDE

[75] Inventors: Irwin J. Ferdinand, Glencoe; Richard Sylvan, Glenview; Michael Peterson, Evanston, all of Ill.

[73] Assignee: Hirsh Company, Skokie, Ill.

[21] Appl. No.: 235,981

[22] Filed: Feb. 19, 1981

[51] Int. Cl.³ .............................................. B27B 9/04
[52] U.S. Cl. ....................................... 269/1; 33/443; 83/745; 269/97; 269/303
[58] Field of Search ................. 83/745; 269/1, 303, 269/97, 249; 33/443, 430

[56] References Cited

U.S. PATENT DOCUMENTS

| | | | |
|---|---|---|---|
| 2,625,184 | 1/1953 | Harbert | 33/500 |
| 2,677,399 | 5/1954 | Getsinger | 83/467 R |
| 2,708,465 | 5/1955 | Huebner et al. | 83/745 |
| 2,735,455 | 2/1956 | Forsberg | 83/745 |
| 2,942,633 | 6/1960 | King | 83/745 |
| 3,011,530 | 12/1961 | Lamb | 83/745 |
| 3,085,343 | 4/1963 | Skripsky | 33/446 |
| 3,186,452 | 6/1965 | Magnussen | 83/745 |
| 3,586,077 | 6/1971 | Pease | 30/376 |
| 3,704,014 | 11/1972 | Keene | 269/249 |
| 3,829,231 | 8/1974 | Hamilton | 83/745 |
| 3,874,261 | 4/1975 | Murray | 83/471.3 |
| 3,910,146 | 10/1975 | Earl | 83/745 |
| 3,915,045 | 10/1975 | Kitzman | 83/745 |
| 4,050,340 | 9/1977 | Flanders | 83/743 |
| 4,059,038 | 11/1977 | Rietema | 83/745 |
| 4,075,920 | 2/1978 | Neal | 83/745 |
| 4,088,290 | 5/1978 | Novello | 83/745 |
| 4,176,572 | 12/1979 | Pennington | 83/862 |
| 4,202,233 | 5/1980 | Larson | 83/745 |

OTHER PUBLICATIONS

McMaster and Carr, 1980 Catalogue–title page and p. 1269.
Macklanburg-Duncan Co. Cutting Guide advertisement (2 pp.).

*Primary Examiner*—Frank T. Yost
*Attorney, Agent, or Firm*—Dressler, Goldsmith, Shore, Sutker & Milnamow, Ltd.

[57] ABSTRACT

Two rails, each having a straight edge, two ends and a cross section defining a channel, are placed in an end-to-end butting relationship to form a continuous straight edge. A joiner plate has an arcuate cross section and has lateral margins for being received in the rail channels. The plate is placed in the rail channels and is fastened to the rails so as to deflect the plate downwardly and force the lateral margins of the plate tight against the rails to align the rails and hold the rails together.

1 Claim, 9 Drawing Figures

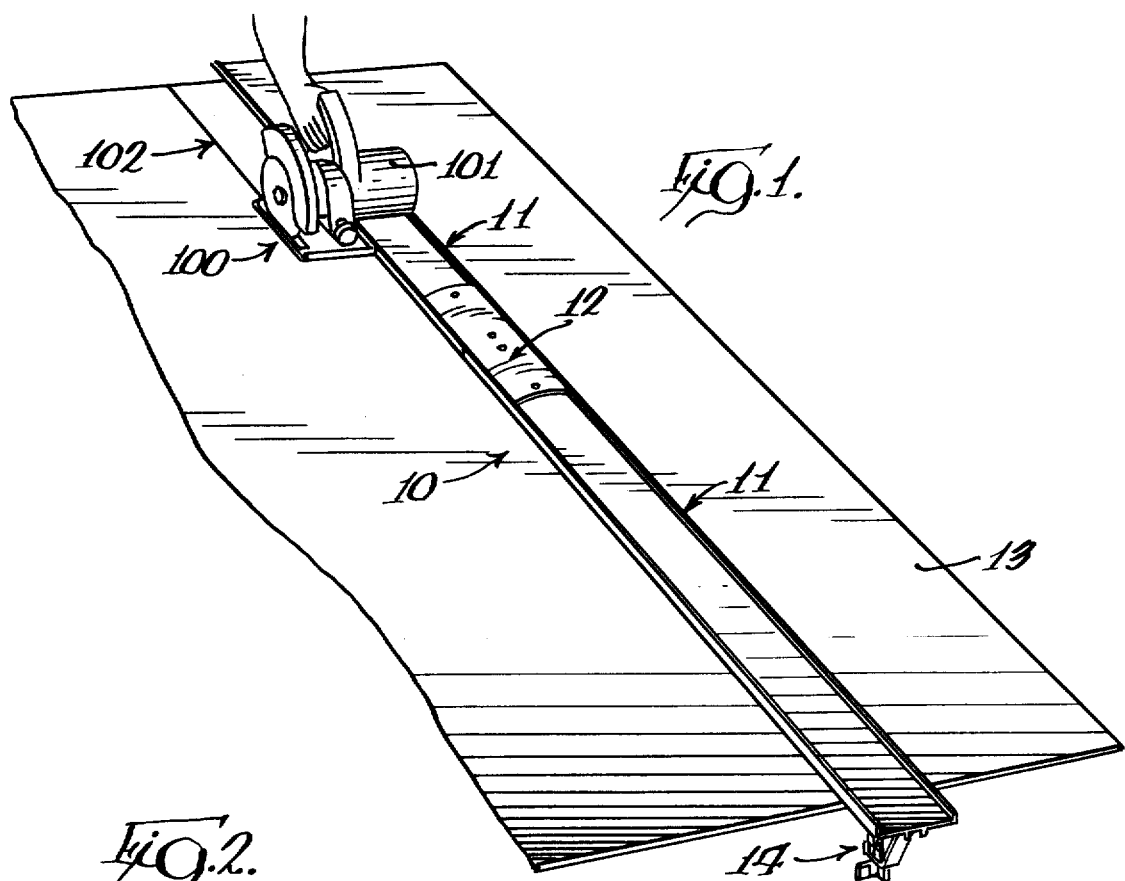
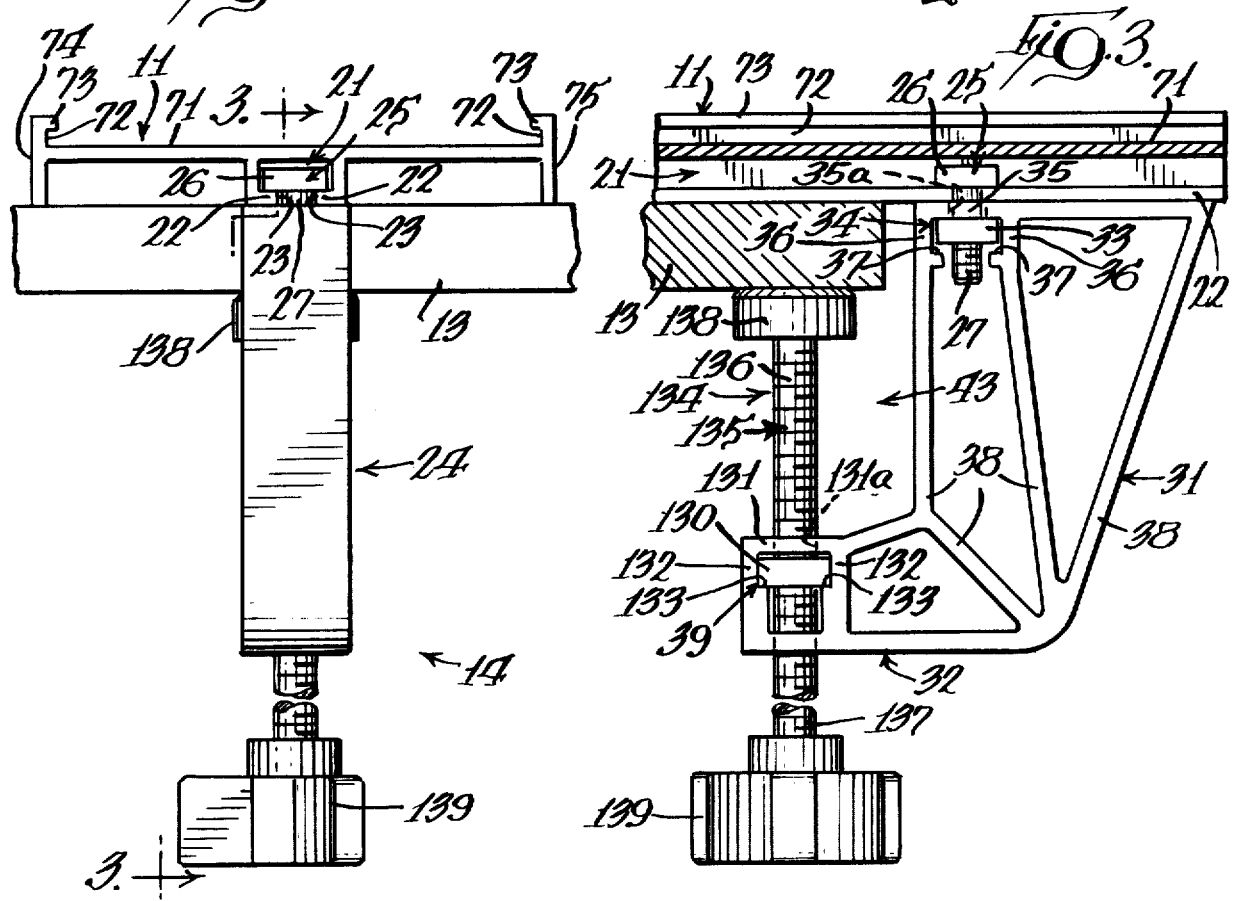

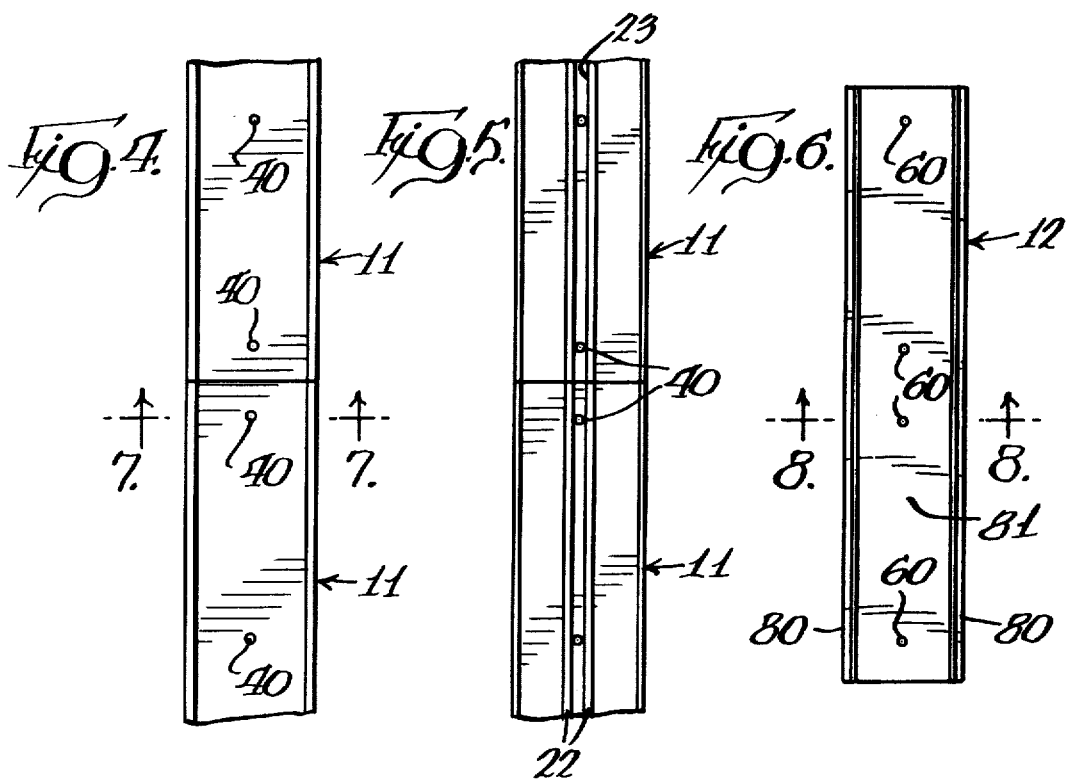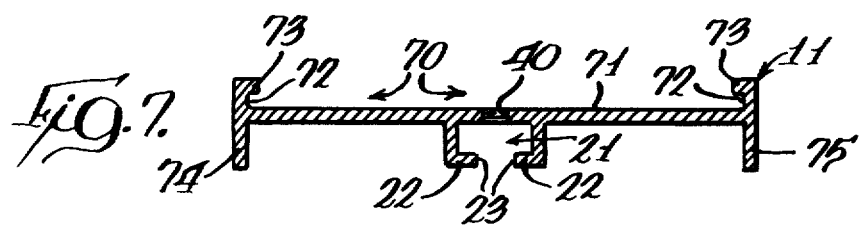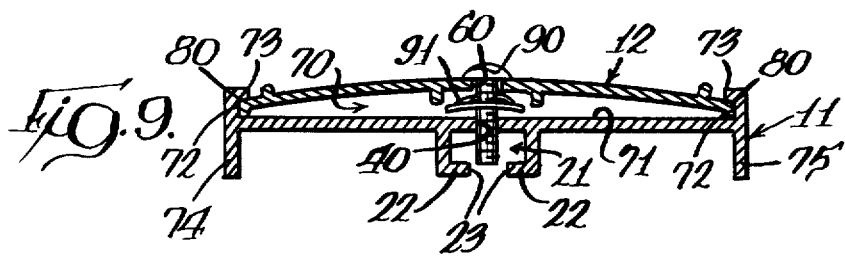

STRAIGHT EDGE GUIDE

TECHNICAL FIELD

This invention relates to cutting guides and straight edges designed to provide an edge or guide surface along which a tool may be moved when being operated on a workpiece.

BACKGROUND OF INVENTION

Various designs for cutting guides and straight edges have been proposed in the past. Many cutting guide or straight edge devices have a single "one-piece" guide member designed to be secured to a workpiece, usually by means of a suitable clamp or clamps. Such one-piece devices are not readily adaptable for use with workpieces having dimensions greater than the length of the device and are awkward to use with workpieces that are substantially shorter than the devices.

Such devices have a further disadvantage. If the device is long enough to be used with large workpieces, the device is likely to be too long or bulky for convenient storage. It would be desirable to provide an expandable straight edge which could be easily disassembled into smaller components for use with smaller workpieces and easy storage.

Disclosures have been made of straight edge devices which are adapted to be extended to form a longer straight edge. Examples of such devices are described in the U.S. Pat. Nos. 2,677,399 and 3,915,045. These devices have relatively complex cross-sectional shapes and are not adapted to be clamped to the workpiece with a clamping mechanism mounted to the bottom of the device.

It would be desirable to provide components that include two or more straight edge guide members that could be quickly, easily and tightly secured together to form a longer straight edge. It would also be desirable to provide a connecting means for tightly securing the two guide members together in a manner that would not require the guide members to have complex shapes and configurations. Preferably, the guide members would be fabricated with a minimum of grooves and ribs that undesirably provide traps for sawdust and the like.

Further, it would be beneficial if the connecting means associated with the guide members would not extend beyond the exterior sides of the guide members. Such a connecting means would not interfere with the use of either exterior side of the guide members as a straight edge or tool guide.

It would also be desirable to provide a channel along the bottom of the guide members for slidably receiving a clamp assembly by which the guide members may be secured to the workpiece.

SUMMARY OF THE INVENTION

The assembly of the present invention is designed to provide an expandable cutting guide and straight edge which can be readily disassembled to provide for its easy storage. Unlike some of the prior cutting guide designs, the present invention is of simple and relatively inexpensive construction, thus providing an expandable straight edge for use by the home hobbyist.

The straight edge assembly comprises two guide members or rails fastened together by a joiner plate fitting within a channel in each of the rails. The joiner plate has an arcuate cross section and lateral margins along its length. One or more fasteners are placed through apertures in the joiner plate and engaged with the rails. When the fasteners are tightened, the joiner plate lateral margins are urged outwardly into firm contact with the rails so as to align and secure the rails together to form a continuous straight edge.

In a preferred embodiment, a clamping channel is provided on the bottom of the rails. The clamping channel slidably receives a clamp which can be positioned at any point along the rails to properly hold the workpiece. The body of the clamp may be constructed with an open frame and a retaining cage to hold a nut. The nut is threadingly engaged with a clamp adjustor which can be rotated to engage the workpiece in the clamp.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification and in which like numerals are employed to designate like parts throughout the same;

FIG. 1 is a perspective, fragmentary view showing the straight edge assembly of the present invention being used as a guide for a circular saw cutting a workpiece;

FIG. 2 is an enlarged, fragmentary end view of the straight edge assembly of FIG. 1 showing the clamp holding the workpiece;

FIG. 3 is a fragmentary, cross-sectional view of the straight edge assembly taken along the planes 3—3 in FIG. 2;

FIG. 4 is a fragmentary, top plan view of the straight edge assembly with the joiner plate removed to better illustrate the ends of the two guide rails butting against each other;

FIG. 5 is a fragmentary, bottom view of the assembly of FIG. 4 showing the ends of the two guide rails butting against each other;

FIG. 6 is a plan view of the joiner plate of the straight edge assembly;

FIG. 7 is a greatly enlarged cross-sectional view taken generally along the plane 7—7 of FIG. 4;

FIG. 8 is a greatly enlarged cross-sectional view of the joiner plate taken generally along the plane 8—8 of FIG. 6; and FIG. 9 is a view similar to FIG. 7 but showing the joiner plate of FIG. 8 fastened in place in the rails with a screw and nut.

DESCRIPTION OF THE PREFERRED EMBODIMENT

This invention may be used in many different forms and the accompanying drawings disclose only one specific form as an example for use of the invention. The invention is not intended to be limited to the embodiment illustrated and the scope of the invention will be pointed out in the appended claims.

The precise shapes and sizes of the components herein described are not essential to the invention unless otherwise indicated. For ease of description, the apparatus of this invention will be described in its normal operating position and such terms as top, bottom, outside edge, etc., will be used with reference to its normal operating position. It will be understood, however, that the apparatus of this invention may be manufactured, stored, transported and sold in an orientation other than the normal operating position described.

Referring now to the drawings, FIG. 1 shows a preferred embodiment of the straight edge assembly 10 comprising two guide rails 11 held in an end-to-end alignment by a joiner plate 12 to provide a long straight edge for guiding a tool or other implement on a workpiece 13.

The straight edge assembly 10 is held in place on the workpiece 13 by means of a clamp 14 which is slidably attached to the bottom of the rail 11. This provides a fixed stationary straight edge along which a tool, such as a portable circular power saw 100, can be moved to make a straight cut 102 in the workpiece 13. The structure of each rail 11, joiner plate 12, and clamp 14 is described in more detail below.

The preferred clamp structure and method of attaching the clamp 14 to one of the rails 11 is shown in FIGS. 2 and 3. The bottom of each rail 11 has a clamping channel 21 comprising two inwardly extending lips 22 which define a slot 23 there between. The clamp 14 is received in the channel 21 as described in detail below.

The clamp 14 has a clamp body 24 comprising a main body portion 31 and a cantilevered body portion 32. The clamp body 24 may be constructed with an open frame comprising a plurality of interconnected frame members 38. The clamp main body portion 31 and the cantilevered body portion 32 together define an adjacent region or throat 37 of the clamp 14 for receiving an end portion of the workpiece. The clamp 14 is slidably attached to the rail 11 in channel 21 at the end of the workpiece by use of a connecting means 25.

The connecting means 25 comprises a cross member 26 and a stem 27 and may be a conventional hex head bolt. The cross member 26 fits into the clamping channel 21 and is engaged by the lips 22 to retain the cross member 26 within the clamping channel 21. The stem 27 extends through the slot 23 (more clearly seen in FIG. 7) and is attached to the main body portion 31 of the clamp 14.

In the preferred embodiment, the stem 23 is threaded and engaged with the clamp body 24 by a nut 33 held against rotation in a retaining cage 34 of the clamp body 24. The cage 34 comprises a top frame member 35 with an aperture 35a, and two opposed side members 36 having seating shoulders 43 on which the nut 33 is supported. The stem 23 passes through the aperture 35a and is threadingly engaged with nut 33. Though not illustrated, it is also possible for the aperture 35a to be threaded and for the connector means to be threadingly engaged therein without the use of a nut.

The cantilevered body portion 32 is provided with a retaining cage 39 in which a nut 130 is retained against rotation. The cage 39 comprises a top frame member 131 with an aperture 131a and two opposed side members 132 having seating shoulders 133 on which the nut 130 is supported.

A clamp adjuster 134 is threadingly engaged with the nut 130 to hold the workpiece 13. The clamp adjuster 134 includes a threaded rod 135 having a first end 136 and a second end 137. Rotation of the rod 135 in one direction or the other will move the first end 136 toward or away from the workpiece 13 to clamp or unclamp the workpiece 13.

In the preferred embodiment, the clamp adjuster 134 is provided with a clamp pressure pad 138 on the threaded rod first end 136 to aid in clamping and to prevent marring of the workpiece 13. A clamp knob 139 is preferably disposed on the second end 137 of rod 135 to facilitate turning the clamp adjuster 134 by hand.

In use, the workpiece 13 is positioned in the throat 37 of the clamp 14 to allow the clamp adjuster pressure pad 138 to contact the workpiece 13 inwardly of the workpiece edge. This allows a more secure clamping arrangement since the pressure pad 138 is less likely to slip off the edge of the workpiece.

By constructing the clamp 14 with a retaining cage and nut, the clamp can be manufactured less expensively from such materials as extruded aluminium and thermoplastic resins. It is unnecessary to manufacture the clamp body 24 of the present assembly out of solid metal, as is common. The relatively inexpensively fabricated open-framed clamp 14 is easily used by the home hobbyist.

The clamp 14 of the present invention, being slidably received in the bottom of the straight edge assembly 10, does not interfere with any cutting or similar operation taking place on the workpiece or above the rail. For example, consider the use of the straight edge assembly 10 as illustrated in FIG. 1. The circular saw 100 typically has a motor case 101 projecting over the straight edge assembly 10. Thus, to avoid interference with the saw 100, it is desirable that no part of the clamp extend above the straight edge assembly or on either side of the assembly.

The ends of the rails 11 are designed to allow two or more such rails to be placed in an end-to-end butting relationship to provide a continuous straight edge as shown at 41 in FIGS. 4 and 5. In the preferred embodiment, both ends are designed to accommodate a butting relationship, thus allowing a plurality of rails to be connected providing an even longer straight edge. Each rail is also preferably provided with at least one threaded aperture 40 near each end of the rail to accommodate the attachment of the joiner plate 12 in a manner to be described in more detail hereinafter.

The cross section of each rail 11 is most clearly shown in FIG. 7. Each rail 11 has a channel 70 into which the joiner plate 12 is received while it holds two rails in an end-to-end butting relationship. The rail channel 70 has a bottom surface 71 and two inwardly facing planer side surfaces 72 that are substantially perpendicular to the bottom surface 71.

In the illustrated preferred embodiment, each rail 11 is provided with flanges 73 extending inwardly from the side surfaces 72 which prevent the joiner plate from being removed vertically from the rails. The exterior portion of each rail 11 has at least one outwardly facing surface 74 which presents a straight surface or edge for guiding a tool or other implement. In that preferred embodiment, the other outwardly facing surface 75 can also serve as a straight edge.

The structure of the joiner plate 12 is shown in FIGS. 6 and 8. FIG. 6 shows the joiner plate 12 with apertures 60 which are located to be aligned with the apertures 40 of the rails 11 when the joiner plate 12 is placed over the butting ends of the rails.

The cross section of the joiner plate 12 is best shown in FIG. 8. The joiner plate 12 has a generally arcuate cross section, two lateral margins 80 and a central region 81 designed to be spaced upwardly from the rail bottom surface 71 when in use. In the preferred embodiment, the joiner plate 12 also has a pair of upper rigidifying ribs 82 and a pair of lower rigidifying ribs 83 which add strength to the joiner plate. The joiner plate 12 is of sufficient width to permit the plate to be received in the channels 70 of the two butting rails with the plate lateral margins 80 engaging each rail within the channels.

To assemble the two rails 11 into one long straight edge assembly, the rails are aligned and butted together end-to-end with the joiner plate 12 engaging the two rails. The central region 81 of the joiner plate 12 is then forced downwardly (by means explained in detail hereinafter) toward the bottom surface 71 of the rail channel 70. This causes the joiner plate 12 to become less arcuate, thus increasing the projected width of the joiner plate. As a result, the lateral margins 80 are urged outwardly into contact with the inwardly facing planer side surfaces 72 of the channel thereby holding and aligning the two rails as an assembly defining one continuous straight edge.

In the preferred embodiment, the downward application of force on the joiner plate is effected by the use of a screw 90. The screw 90 passes through the aperture 60 of the joiner plate 12 and threadingly engages the rail 11 in the threaded aperture 40.

If desired, a nut 91 may be threaded on screw 90 beneath the joiner plate 12 so that the screw 90 remains connected to the joiner plate 12 when the straight edge rail assembly is taken apart. The nut 91 is illustrated as a Tinnerman nut which is mounted "backwards" on the screw 90 beneath the plate 12 to permit the screw 90 to still be threadingly adjusted in either direction of rotation as necessary when connecting or disconnecting the rails.

The novel rail connection design described above, wherein the joiner plate 12 is disposed within the rails 11, provides an additional advantage. Since the joiner plate 12 does not extend beyond the exterior sides of the guide rails, it does not interfere with the operation of tools, such as the circular power saw 100 and its overhanging motor 101. The novel joiner plate 12 allows both outside edges to be used as straight edges.

The foregoing specification is intended as illustrative and is not to be taken as limiting. Still other variations within the spirit and scope of this invention are possible and will readily present themselves to those skilled in the art.

What is claimed is:

1. An assembly presenting a straight edge with means for being secured to a work piece, the assembly comprising:
  (a) a rail defining a straight edge and a clamping channel with a pair of opposed lips extending inwardly over the channel and defining therebetween a slot, the rail adapted to be positioned on a workpiece with the channel opening toward the workpiece and extending on either end of the rail beyond the workpiece;
  (b) a clamp body adapted to be positioned at each end of the workpiece and mounted on the rail, each clamp body having a main body portion and a cantilevered body portion at one end of the main body portion extending laterally from the main body portion, the cantilevered body portion defining a first retaining cage for receiving and retaining a first nut therein, said clamp main body portion defining a second retaining cage for receiving and retaining a second nut therein;
  (c) connector means for attaching the clamp body to the rail, the connector means having a threaded stem carried by the main body portion and a cross member attached to the stem, the cross member being received in the channel and extending across the slot for being retained by the lips of the channel with the stem extending through the slot;
  (d) a first nut retained against rotation in the first retaining cage in the cantilevered body portion;
  (e) a second nut retained against rotation in the second retaining cage and threadingly engaged with said connector means stem; and
  (f) a clamp adjuster means for engaging the workpiece, the adjuster means including a threaded rod having a first end and a second end, said rod being threadingly engaged with the first nut within the first retaining cage and extending therefrom in the opposite direction at said second end whereby the threaded rod may be rotated relative to the first nut to cause the threaded rod first end to move toward the rail to thereby clamp the workpiece between the rod first end and the rail.

* * * * *